US010915750B2

(12) United States Patent
He et al.

(10) Patent No.: US 10,915,750 B2
(45) Date of Patent: *Feb. 9, 2021

(54) METHOD AND DEVICE FOR SEARCHING STRIPE SET

(71) Applicant: Guangdong Virtual Reality Technology Co., Ltd., Guangzhou (CN)

(72) Inventors: Jie He, Guangzhou (CN); Jingwen Dai, Guangzhou (CN); Congling Wan, Guangzhou (CN); Yongtao Hu, Guangzhou (CN)

(73) Assignee: GUANGDONG VIRTUAL REALITY TECHNOLOGY CO., LTD., Guangzhou (CN)

( * ) Notice: Subject to any disclaimer, the term of this patent is extended or adjusted under 35 U.S.C. 154(b) by 223 days.

This patent is subject to a terminal disclaimer.

(21) Appl. No.: 16/138,901

(22) Filed: Sep. 21, 2018

(65) Prior Publication Data
US 2019/0034720 A1  Jan. 31, 2019

Related U.S. Application Data

(63) Continuation of application No. PCT/CN2016/076979, filed on Mar. 22, 2016.

(51) Int. Cl.
*G06K 9/62* (2006.01)
*G06K 9/00* (2006.01)
(Continued)

(52) U.S. Cl.
CPC ..... *G06K 9/00536* (2013.01); *G06K 9/00503* (2013.01); *G06K 9/00624* (2013.01);
(Continued)

(58) Field of Classification Search
CPC .......... G06K 9/00536; G06K 9/00624; G06K 9/00503; G06K 9/6202; G06K 9/00355;
(Continued)

(56) References Cited

U.S. PATENT DOCUMENTS

| 2003/0001867 A1 | 1/2003 | Matsumoto | |
| 2013/0026945 A1* | 1/2013 | Ganick | H05B 45/10 315/246 |
| 2018/0173327 A1* | 6/2018 | He | G06F 3/0325 |

FOREIGN PATENT DOCUMENTS

| CN | 1882041 A | 12/2006 |
| CN | 102779279 A | 11/2012 |

(Continued)

*Primary Examiner* — Andrew M Moyer
(74) *Attorney, Agent, or Firm* — Cheng-Ju Chiang

(57) ABSTRACT

Method and device for searching stripe set are disclosed herein. The method involves: receiving a raw image captured by a rolling shutter image sensor, wherein the raw image includes stripe pattern formed by flashing light source; binarizing the raw image to obtain a binary image, according to a binary threshold, wherein the binary image has two pixel values, one of the two pixel values is set as a preset first value; searching a connected domain having pixels with a first value to obtain a plurality of first connected domains, according to the pixel value in the binary image; selecting a target connected domain corresponding to the stripe pattern from the plurality of first connected domains; determining stripe set according to the target connected domain, wherein the stripe set is the set of the target connected domain corresponds to the stripe pattern.

20 Claims, 7 Drawing Sheets

(51) Int. Cl.
  *H04N 5/232* (2006.01)
  *H04N 5/235* (2006.01)
  *G06T 5/00* (2006.01)

(52) U.S. Cl.
  CPC ............ *G06K 9/6202* (2013.01); *G06T 5/002* (2013.01); *H04N 5/232* (2013.01); *H04N 5/2354* (2013.01)

(58) Field of Classification Search
  CPC ...... H04N 5/232; H04N 5/2354; G06T 5/002; G06T 7/41; G06F 3/017
  USPC ........................................................ 382/209
  See application file for complete search history.

(56) References Cited

FOREIGN PATENT DOCUMENTS

| | | | |
|---|---|---|---|
| CN | 103886552 A | 6/2014 |
| CN | 105046260 A | 11/2015 |
| WO | 2017/161495 A1 | 9/2017 |

\* cited by examiner

METHOD AND DEVICE FOR SEARCHING STRIPE SET

RELATED APPLICATION

This application is a continuation application of PCT international application No. PCT/CN2016/076979, filed Mar. 22, 2016, titled "METHOD, DEVICE AND SYSTEM FOR SEARCHING STRIPE SET", which is hereby incorporated by reference in its entirety.

FIELD OF THE INVENTION

The present disclosure generally relates to the field of image processing, and more particularly, to a method and device for searching stripe set.

BACKGROUND

With the development of technology of human-computer interaction, using moving object such as swinging gesture to input instructions, to replace a method of direct contact with computer device, has become a development trend. Therefore, how to track human gestures or a state of moving objects has become a problem that needs to be solved. A motion tracking system can image the light-spot of flashing light source of the moving object to track the moving object by image processing method. However, in actual scene, the result of identifying light-spot will always be influenced by ambient light, such as fluorescent lamp and/or incandescent lamp, because the raw image includes not only pattern formed by the light-spot, but also pattern formed by the ambient light.

SUMMARY

Disclosed embodiments provide methods for eliminating the impact of the patterns formed by fluorescent lamps and incandescent lamps on the recognition of the stripe pattern formed by a flashing light source.

According to a first aspect, there is provided a method for searching stripe set, comprising receiving a raw image captured by a rolling shutter image sensor, the raw image includes stripe pattern formed by flashing light source; binarizing the raw image to obtain a binary image, according to a binary threshold, the binary image has two pixel values, one of the two pixel values is set as a preset first value; searching a connected domain having pixels with a first value to obtain a plurality of first connected domains, according to the pixel value in the binary image; selecting a target connected domain corresponding to the stripe pattern from the plurality of first connected domains; determining stripe set according to the target connected domain, wherein the stripe set is the set of the target connected domain corresponds to the stripe pattern.

According to the first embodiment of the method, in connection with the first aspect, selecting a target connected domain, comprises determining a width of each of the first connected domains, comparing the width of each first connected domain with a preset width, and determining the eligible first connected domain as the target connected domain according to the result of comparison.

According to the second embodiment of the method, in connection with the first embodiment of the first aspect, comparing the width of each first connected domain with a preset width, determining the eligible first connected domain as the target connected domain comprises, setting an x-axis having extension direction of stripe of the preset stripe pattern, and taking a y-axis perpendicular to the x-axis, according to imaging plane of the rolling shutter image sensor; traversing all of the pixels of the plurality of first connected domains to obtain a maximum column coordinates y1 and a minimum column coordinates y2 of the pixels in each first connected domain; taking the maximum column coordinate y1 minus the minimum column coordinate y2 to determine the width of each first connected domain; judging whether the width of each first connected domain is met: w≥kh1, and w≤kh2, wherein kh1 is a preset first boundary condition parameter, kh2 is a preset second boundary condition parameter, w is the width of the first connected domain; selecting the first connected domain as the target connected domain when the width of the first connected domain is met: w≥kh1, and w≤kh2.

According to the third embodiment of the method, in connection with the second embodiment of the first embodiment of the first aspect, further comprises, deleting first connected domain, when the width of the first connected domain is met: w<kh1 or w>kh2, from the plurality of first connected domains.

According to the fourth embodiment of the method, in connection with the first aspect, further comprises, prior to selecting the target connected domain, processing the raw image to obtain a template of stripe pattern; identifying the target connected domain according to the template of stripe pattern, wherein the shape of the template of stripe pattern is a light spot formed by the stripe pattern in the raw image.

According to the fifth embodiment of the method, in connection with the fourth embodiment of the first aspect, processing the raw image comprises, filtering the raw image according to a filtering parameter to obtain a blurred image, wherein the filtering parameter is configured to merge the stripe pattern in the raw image into a light spot; binarizing the blurred image to obtain a binary blurred image; searching connected domain in the binary blurred image to obtain a plurality of second connected domains; identifying the shape of the plurality of second connected domains; and selecting a second connected domain closest to the stripe pattern formed by the predetermined flashing light source as the template of stripe pattern.

According to the sixth embodiment of the method, in connection with the fifth embodiment of the fourth embodiment of the first aspect, identifying the target connected domain comprises, judging whether the coordinates of all pixels of the first connected domain fall within the set of the coordinates of the pixels in the template of stripe pattern; if yes, determining the first connected domain as the target connected domain.

According to the seventh embodiment of the method, in connection with the first aspect, the raw image includes a plurality of stripe patterns formed by a plurality of flashing light sources, determining stripe set according to the target connected domain comprises, classifying the target connected domains to obtain a plurality of stripe sets.

According to the eighth embodiment of the method, in connection with the seventh embodiment of the first aspect, classifying the target connected domains to obtain a plurality of stripe sets comprises, determining an initial stripe set according to the condition of the target connected domain constitutes a stripe set, and selecting the target connected domain which is not classified as any initial stripe pattern; selecting the jth target connected domain from the target connected domains which are not classified into any initial stripe set, wherein j is a positive integer; making a circle having a center corresponds to the center of mass of the jth target connected domain, and a diameter corresponds to the length of the jth target connected domain; judging whether any of the target connected domains in the initial stripe set intersects the circle; if intersects, classifying the jth target connected domain into the initial stripe set correspondingly.

According to the ninth embodiment of the method, in connection with the first aspect, further comprise, after classifying the target connected domains to obtain a plurality of stripe sets, judging whether the stripe set satisfies the following conditions simultaneously; the number of the target connected domains in the stripe sets is greater than a number threshold, and a length of the longest target connected domain of the stripe sets is greater than a length threshold; deleting the stripe set, if the conditions are not satisfied simultaneously.

According to another aspect, there is provided an electronic device comprising, a rolling shutter image sensor, one or more processors, and memory storing one or more programs configured to be executed by the one or more processors; when the processor executing the programs, the methods mentioned above are performed for searching stripe set According to another aspect, there is provided a non-transitory computer readable storage medium storing on or more programs configured to be executed by one or more processors of an electronic device, the one or more programs comprising instruction for performing the methods mentioned above.

The present invention can eliminate the impact of the patterns formed by fluorescent lamps and incandescent lamps, through binarize the raw image included the stripe pattern formed by the flashing light source, search a connected domain of binary image to obtain a plurality of first connected domain, select a target connected domain corresponding to the stripe pattern from the plurality of first connected domains.

DETAILED DESCRIPTION

Figure 1:
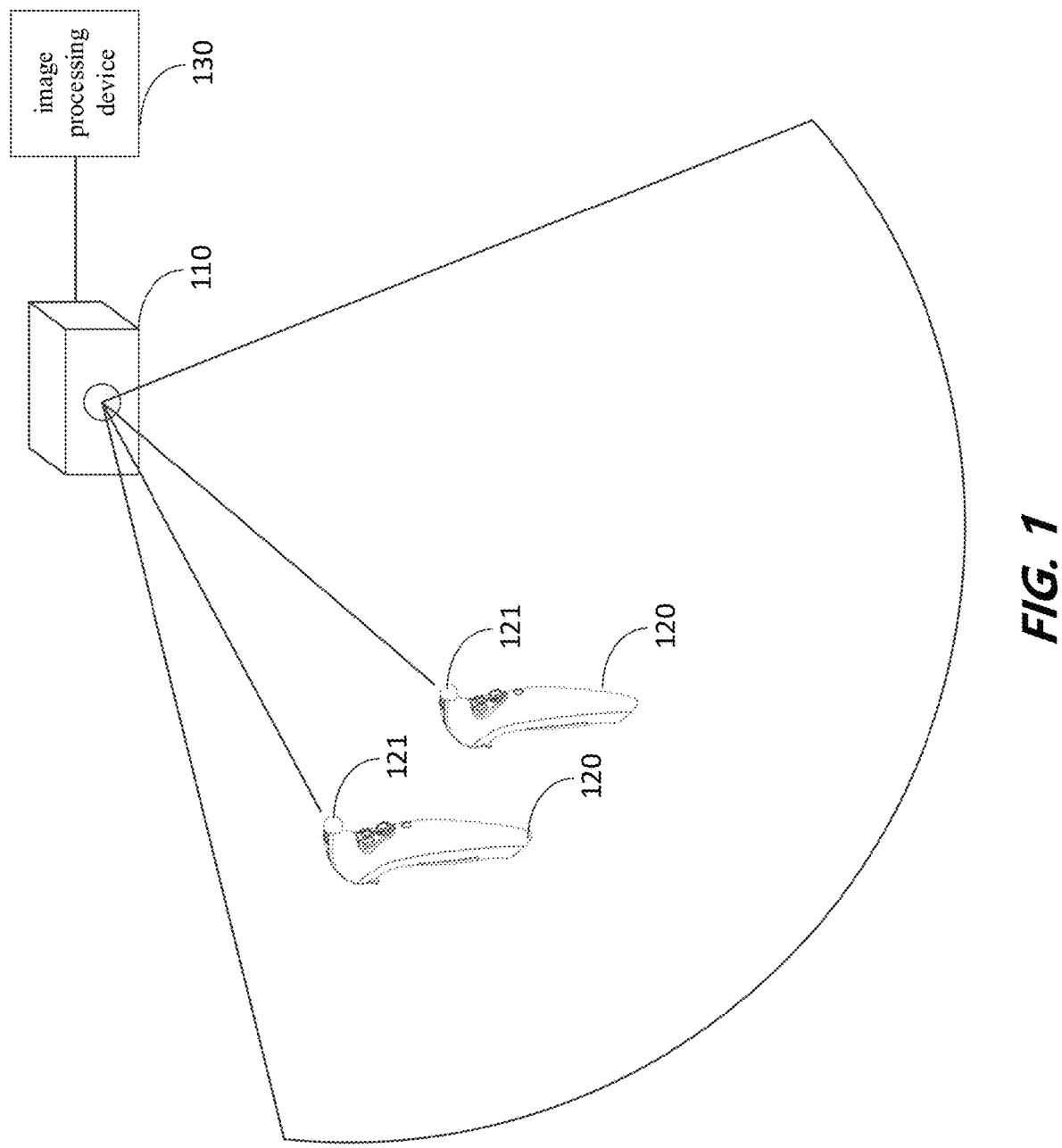
FIG. 1 illustrates a schematic diagram of a motion tracking system, according to some embodiments of the disclosure.
Figure 2:
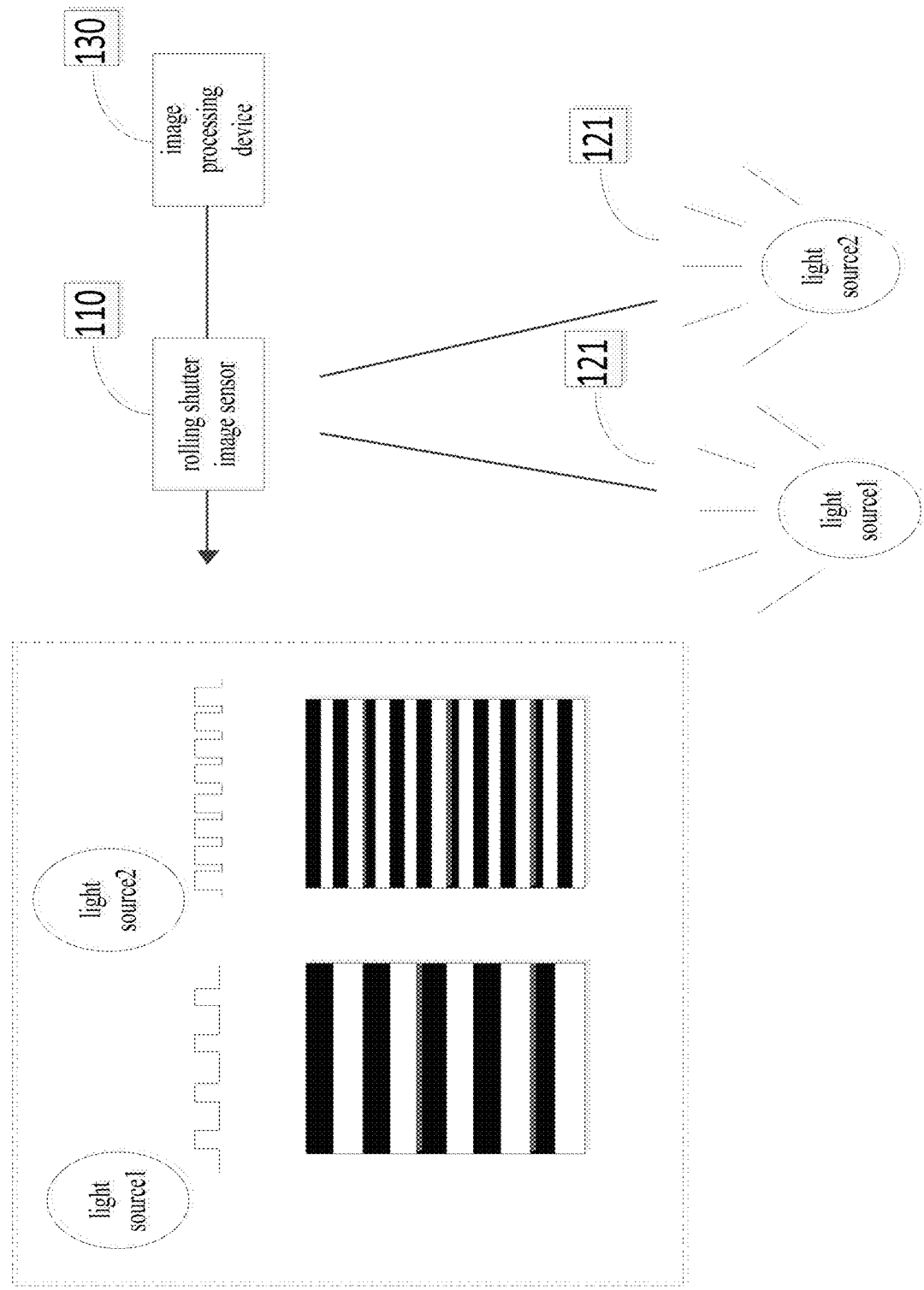
FIG. 2 illustrates a schematic diagram of a stripe pattern of a flashing light source captured by a rolling shutter image sensor in a motion tracking system, according to some embodiments of the disclosure.

As illustrated in FIG. 1 and FIG. 2, an embodiment of the disclosure provides a motion tracking system. The motion tracking system may include a rolling shutter image sensor 110, one or more controllers 120 with flashing light source 121, and an image processing device 130.

The rolling shutter image sensor 110 may be an image sensor with a rolling shutter, such as, a Complementary Metal Oxide Semiconductor (CMOS) sensor includes an electronic rolling shutter, a Charge Coupling Element (CCD) sensor includes a rolling shutter, or any type of image sensor capable of capturing incident photons and reading pixel data. The rolling shutter image sensor 110 may be provided on the image processing device, or may be provided on a separate third-party device. The rolling shutter image sensor 110 may scan the pixel date in row by row fashion, or in column by column fashion.

The controller 120 may be a game controller, a pointer, somatosensory mouse, or the like, with one or more flashing light sources. The number of the controller 120 in the motion tracking system may be one or more. The number of the flashing light source on each controller may also be one or more. The flashing light source may be a light source having a relatively stable flashing frequency or a changing flashing frequency, for example, an LED or the like. By controlling the duty cycle of the power input to the LED, it is possible to control the LED flashing at a fixed frequency or a non-fixed frequency, wherein the flashing frequency of the flashing light source is higher than the scanning frequency of the rolling shutter image sensor.

The image processing device 130 may be an entity with good computing power, such as an embedded processor, a digital image processor, a smart phone, a computer, a tablet computer, a notebook, and the like. The image processing device 130 may be provided with the rolling shutter image sensor, or may not be provided.

In one embodiment, the rolling shutter image sensor 110 may be an image sensor with a rolling shutter configured to capture a raw image of the flashing light source on the controller 120 by image-forming exposure. The flashing light source, having stable flashing frequency or variable flashing frequency, can be formed in the raw image including a pattern of alternating dark/white stripes in the horizontal direction by the rolling shutter image sensor 110. Specifically, if the flashing light source is "on", when the rolling shutter image sensor 110 scans the flashing light source, a white stripe corresponding to the flashing light source may appear in the raw image. If the flashing light source is "off", when the rolling shutter image sensor 110 scans the flashing light source, a dark stripe corresponding to the flashing light source may appear in the raw image. The flashing frequency of the flashing light source is higher than the scanning frequency of the rolling shutter image sensor 110. Correspondingly, after scanning of the flashing light source, a pattern of alternating dark/white stripes may appear in the raw image.

Figure 3:
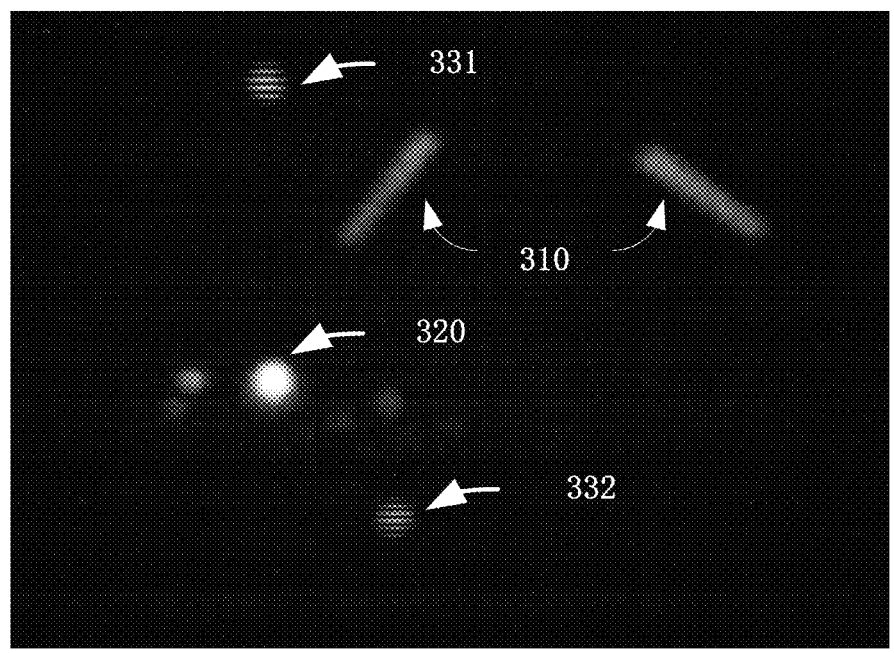
FIG. 3 illustrates a raw image captured by a rolling shutter image sensor in a motion tracking system in an actual working condition, according to some embodiments of the disclosure.

As illustrated in FIG. 3, the raw image may include one or more light spots formed by fluorescent lamps 310 and incandescent lamps 320 in the environment inevitably, after image-forming exposure, due to the influence of actual imaging environment, in addition to the stripes formed by the flashing light sources 331 and 332. Therefore, after the raw image being captured by the rolling shutter image sensor 110, the rolling shutter image sensor 110 may send the raw image to the image processing device. The processing device may process the raw image to exclude influence of the light spots formed by the fluorescent lamp 310 and the incandescent lamp 320. The stripes formed by the flashing light sources 331 and 332 may be recognized from the raw image.

In general, stripe patterns in the raw image may include a pattern of alternating dark/white stripes formed by exposing the flashing light source 331, and a pattern of alternating dark/white stripes formed by exposing the flashing light source 332, for ease of discussion and illustration, the white stripes will be used to as an example in the following description.

The shape of the outline of the stripe pattern in the raw image can be related to the shape of the flashing light source 331 or 332. For example, if the shape of the flashing light source 331 or 332 is circular, the stripe pattern may include a plurality of white stripes with different lengths, and the outline of the stripe pattern is circular. If the shape of the flashing light source 331 or 332 is rectangular, the stripe pattern may include a plurality of white stripes with same length, and the outline of the stripe pattern is rectangular. The width of the white stripes in the pattern are related to the flashing period of the flashing light source 331 or 332, for example, the longer flashing period of the flashing light source 331 or 332 may produce the wider width of the white stripes. Under extreme conditions, if the flashing period of the flashing light source 331 or 332 is infinite, the flashing light source 331 or 332 will form a light spot on the raw image without stripes. There is one to one correspondence between the number of the stripe pattern in the raw image and the number of the flashing light source in the field of the rolling shutter image sensor, for example, if the number of flashing light sources in the field of the rolling shutter image sensor is two, the number of stripe pattern in the raw image is two.

Figure 4:
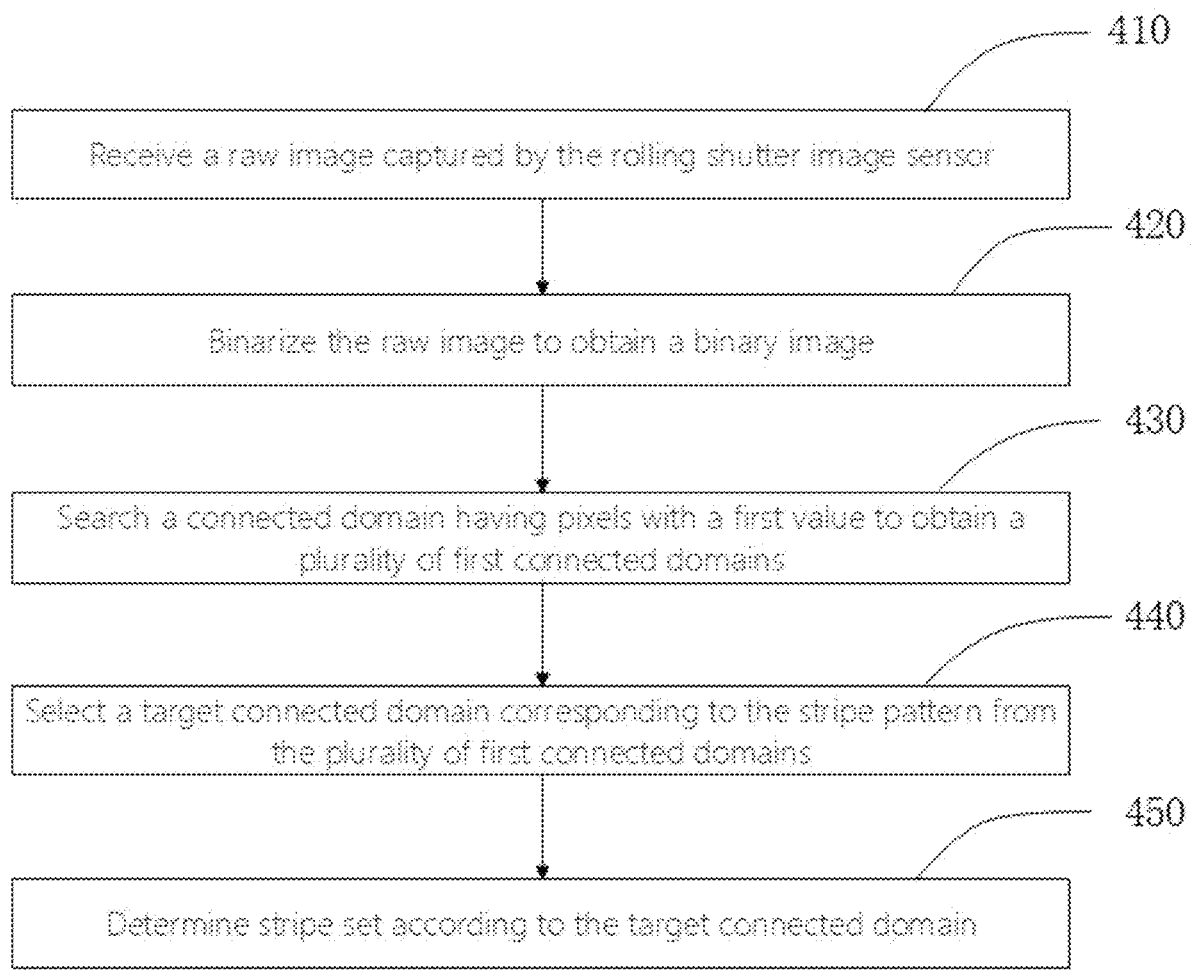
FIG. 4 illustrates a flow chart of a method for searching stripe set, according to some embodiments of the disclosure.

FIG. 4 illustrates a method for searching stripe set corresponding to stripe pattern of the flashing light source in the raw image by image processing device. The method may include the following steps.

In step 410, receiving a raw image captured by the rolling shutter image sensor.

In step 420, binarizing the raw image to obtain a binary image, according to a binary threshold.

In step 430, searching a connected domain having pixels with a first value to obtain a plurality of first connected domains, according to the pixel value in the binary image.

In step 440, selecting a target connected domain corresponding to the stripe pattern from the plurality of first connected domains.

In step 450, determining stripe set according to the target connected domain, wherein the stripe set is the set of the target connected domain corresponds to the stripe pattern.

In some embodiments, since the rolling shutter image sensor may be provided on the image processing device, or may be provided on a separate third-party device, the image processing device may directly obtain the raw image by exposing the flashing light source through the rolling shutter image sensor, or may indirectly receive the raw image transmitted by the third-party device, which is obtained by exposing the flashing light source.

In some embodiments, binarizing the raw image to obtain a binary image after receiving the raw image captured by the rolling shutter image sensor. Specifically, the raw image can be binarized according to the following formula:

$$\begin{cases} P(i) = P_1, P(i) > x \\ P(i) = P_2, P(i) \le x_\circ \end{cases};$$

Figure 5:
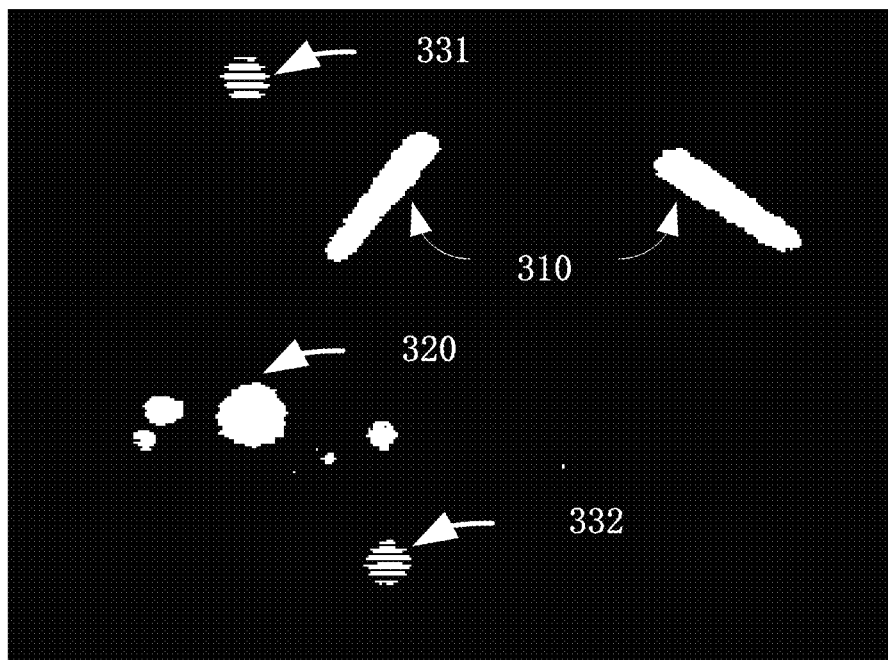
FIG. 5 illustrates an image obtained in a method for searching stripe set after executing the step 420 in FIG. 4, according to some embodiments of the disclosure.

Wherein, "i" is a sequence number of the pixel in the raw image, "P (i)" is a pixel value of the pixel "i" in the raw image, "x" is a preset binary threshold, "$P_1$" is a preset first value, "$P_2$" is a preset second value. In the raw image, due to the pixel value of the flashing light source is close to the pixel value of the incandescent lamp and the fluorescent lamp, the pixel value of the flashing light source is much different from the pixel value of the background. Therefore, the binary threshold x may be set in advance, so as to the pixels of the stripe pattern formed by the flashing light source, the pixels corresponding to the light spot formed by the incandescent lamp and the fluorescent lamp or the like, is greater than the binary threshold x, the pixels of the background pixels is less than or equals to the binary threshold x. For example, when the first value is preset to "1", the second value is preset to "0"; when the first value is preset to "0", the second value is preset to "1". As illustrated in FIG. 5, in the binary image obtained by binarizing the raw image, the pixels of the stripe pattern formed by the flashing light source, and the pixels corresponding to the light spot formed by the incandescent lamp and the fluorescent lamp or the like are set to "1", the pixels corresponding to the background are set to "0".

In some embodiments, the method of setting the binary threshold may include a global thresholding method, an adaptive thresholding method, a local thresholding method, or the like.

In some embodiments, the global thresholding method may be implemented as follows: presetting a global threshold and using the preset global threshold as a binary threshold for the raw images in all frames. For a specific frame of the raw image, all pixels in the raw image are compared with the binary threshold to obtain a binary image, wherein the global threshold may be set according to experience of human being.

In some embodiments, the adaptive thresholding method may be implemented as follows: determining a binary threshold of the raw image in current frame based on information of the raw image in previous frames. For current frame of the raw image, all pixels in the raw image are compared with the binary threshold to obtain a binary image.

In some embodiments, the local thresholding method may be implemented as follows: scanning the image from top to bottom and from left to right, judging whether the pixel value of every pixel is less than the preset threshold. If the pixel value of the pixel "i" is less than the preset threshold, it will not be processed temporarily. If the pixel value of the pixel "i" is greater than or equals to the preset threshold, the method may include calculating the average value or the Gaussian mean value of the pixel values in the N×N neighborhood of the current pixel "i", and taking the calculated average value or Gaussian mean value as the binary threshold of the current pixel "i", wherein N is a positive integer greater than 0. The pixel value of the pixel "i" is compared with the binary threshold of the pixel "i", if the pixel value of pixel "i" is greater than the binary threshold of pixel "i", the pixel value of pixel "i" is set to the first threshold value, and if the pixel value of pixel "i" is less than the binary threshold the pixel value of pixel "i" is set to the second threshold value, thereby obtaining the binary image.

In some embodiments, after obtaining the binary image, a connected domain corresponding to pixels having a first value is searched in the binary image, to obtain a plurality of first connected domains. Specifically, in the binary image, if the pixel A and the pixel B are 4 adjacent or 8 adjacent, the pixel A is connected to the pixel B. Wherein, the pixel I (x, y) is 4 adjacent to the pixel I (x−1 y), the pixel I (x+1, y), the pixel I (x, y−1), and the pixel I (x, y+1), the pixel I (x, y) is 8 adjacent to the pixel I (x−1 y−1), the pixel I (x−1, y), the pixel I (x−1, y+1), the pixel I (x, y−1), the pixel I (x, y+1), the pixel (x+1,y−1), the pixel (x+1,y), and the pixel (x+1,y+1). If the pixel A is connected to the pixel B, and the pixel B is connected to the pixel C, the pixels A, B, and C belong to a same connected domain. Finding the connected domain, by the method of Two-Pass or Seed-Filling, to obtain a plurality of first connected domains. As illustrated in FIG. 5, the connected domains corresponding to the stripe patterns formed by the flashing light sources 331 and 332, the light spots formed by the incandescent lamp 320 and the fluorescent lamp 310, can be included in the plurality of first connected domains, wherein each stripe in the stripe patterns corresponds to a first connected domain, each light spot formed by incandescent lamp 320 and fluorescent lamp 310 corresponds to a first connected domain.

In some embodiments, after obtaining a plurality of the first connection domains, the first connection domain corresponding to the stripe pattern formed by the flashing light source is selected from the plurality of first connection domains as target connected domain. In particular, the target connected domain may be obtained in two ways:

In the first way, determining a width of each of the first connected domains, comparing the width of each first connected domain with a preset width, and determining the eligible first connected domain as the target connected domain according to the result of comparison.

Figure 6:
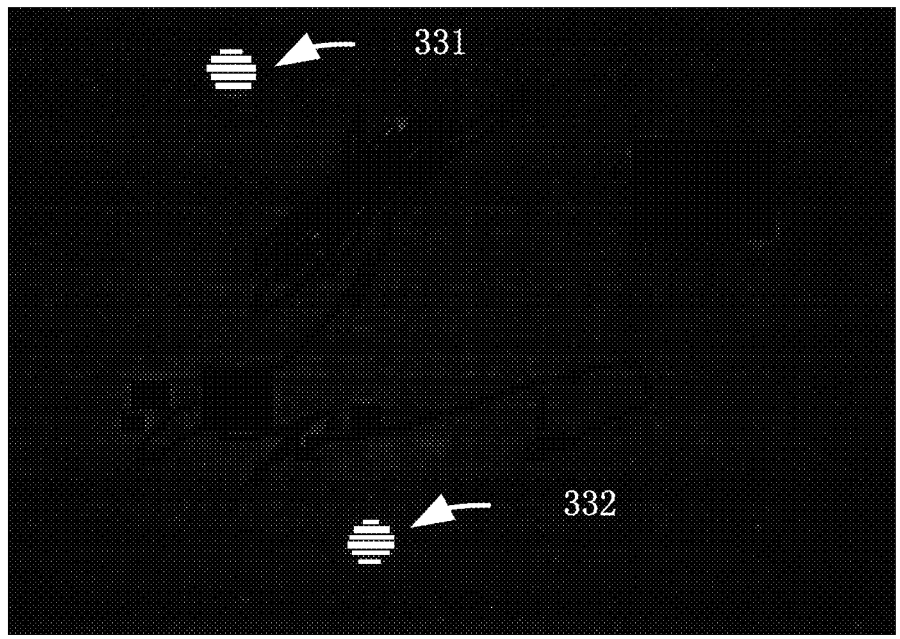
FIG. 6 illustrates an image obtained in a method for searching stripe set after executing the step 440 in FIG. 4, according to some embodiments of the disclosure.

Specifically, since the width of the first connected domain corresponding to the stripe in the pattern formed by the flashing light source is much less than the width of the first connected domain corresponding to the light spot formed by the fluorescent lamp 310 or the incandescent lamp 320, and the width of the first connected domain corresponding to the stripe can not be too small. It is possible to determine whether the first connected domain is the target connected domain by the following method: setting an x-axis having the extension direction of stripe of the preset stripe pattern, and taking a y-axis perpendicular to the x-axis, according to imaging plane of the rolling shutter image sensor; traversing all of the pixels of the plurality of first connected domains to obtain a maximum column coordinates y1 and a minimum column coordinates y2 of the pixels in each first connected domain; taking the maximum column coordinate y1 minus the minimum column coordinate y2 to determine the width of each first connected domain; judging whether the width of each first connected domain is met: $w \geq kh1$, and $w \leq kh2$, wherein kh1 is a preset first boundary condition parameter, kh2 is a preset second boundary condition parameter, w is the width of the first connected domain; selecting the first connected domain as the target connected domain when the width of the first connected domain is met: $w \geq kh1$, and $w \leq kh2$. If the width of first connected domain does not met: $w \geq kh1$, and $w \leq kh2$, the first connected domain may not be considered as a target connected domain, then deleting the first connected domain which is not the target connected domain. As illustrated in FIG. 6, the stripe patterns can be presented on the image individually, when deleting the first connected domains which are not the target connected domains.

In some embodiments, the first boundary condition parameter kh1 and the second boundary condition parameter kh2 may be determined as follows: if a flashing period of the flashing light source is T, a duty cycle of the modulated signal of the flashing light source is 1, an exposure time of the rolling shutter image sensor by row or column is t, then the first boundary condition parameter is $kh1=(\Phi*T)/(2t)$, the second boundary condition parameter is $kh2=K*(\Phi*T)/(2t)$, wherein K is a tuning parameter.

In the second way, processing the raw image to obtain a template of stripe pattern, identifying the target connected domain according to the template of stripe pattern, wherein the shape of the template of stripe pattern is a light spot formed by the stripe pattern in the raw image.

Specifically, filtering the raw image according to a filtering parameter to obtain a blurred image, wherein the filtering parameter is configured to merge the stripe pattern in the raw image into a light spot; binarizing the blurred image to obtain a binary blurred image; searching the connected domain in the binary blurred image to obtain a plurality of second connected domains; identifying the shape of the plurality of second connected domains, and selecting a second connected domain closest to the stripe pattern formed by the predetermined flashing light source as the template of stripe pattern.

The second connected domains, as mentioned above, may correspond to the light spots formed by the stripe patterns, the incandescent lamps and the fluorescent lamps, each of the stripe patterns, light spots formed by the incandescent lamp and the fluorescent lamp corresponds to one second connected domain, respectively. Since the shape of the second connected domains corresponds to the light spot formed by the stripe patterns are different from the shape of the second connected domains correspond to the light spots formed by the incandescent lamp and the fluorescent lamp, the shape of the plurality of second connected domains can be identified, and the second connected domain closed to the stripe pattern formed by the predetermined flashing light source can be selected as the template of stripe pattern.

After that, finding a set of coordinates of the pixels in the template of stripe pattern, if it is judged that the coordinates of all pixels of the first connected domain fall within the set of the coordinates of the pixels in the template of stripe pattern, it can be determined that the first connected domain is the target connected domain. Otherwise, it can be determined that the first connected domain is not the target connected domain. Performing the Judgement for each of the first connected domains as above, the target connected domains corresponding to the stripe patterns can be found out.

Figure 7:
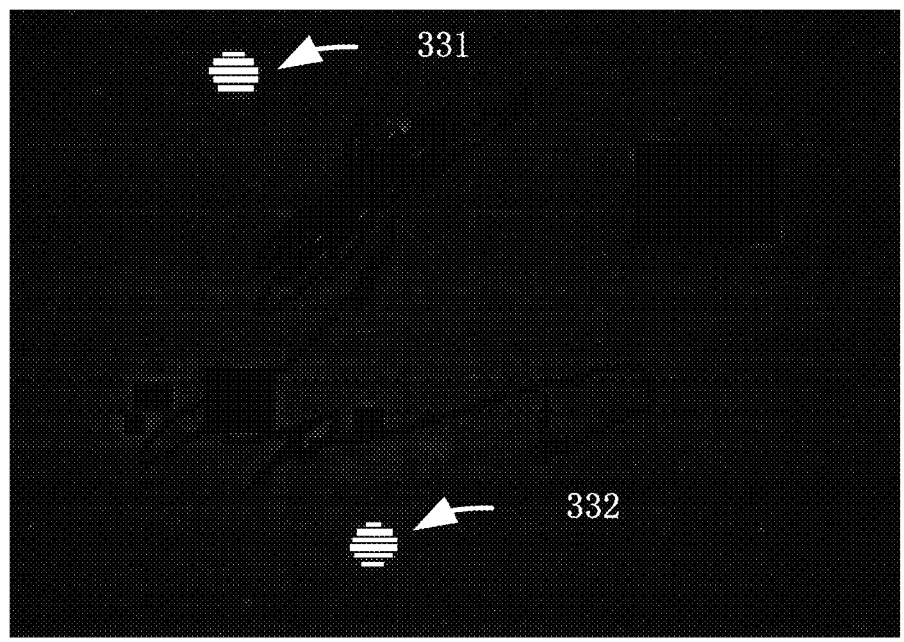
FIG. 7 illustrates an image obtained in a method for searching stripe set after executing the step 450 in FIG. 4, according to some embodiments of the disclosure.

In some embodiments, if the raw image includes a plurality of stripe patterns formed by a plurality of flashing light sources, it is necessary to classify the found target connected domains to obtain a plurality of stripe sets. Specifically, determining an initial stripe set according to the condition of the target connected domain constitutes a stripe set, and selecting the target connected domain which is not classified as any initial stripe pattern, wherein the condition of the target connected domain to constitute a stripe set may include: selecting a target connected domain which is not classified into any stripe set randomly, classifying the selected target connected domain into a stripe set to obtain the initial stripe set; and then, selecting the jth target connected domain from the target connected domains which are not classified into any initial stripe set, wherein j is a positive integer; making a circle having a center corresponds to the center of mass of the jth target connected domain, and a diameter corresponds to the length of the jth target connected domain; judging whether any of the target connected domains in the initial stripe set intersects the circle, if intersecting, the jth target connected domain is classified into the corresponding initial stripe set; updating the initial stripe set to a stripe set, after judging each of the target connected domains that are not classified into any of the stripe set as mentioned above. The result of searching presented on the image is shown in FIG. 7, after performing the steps of searching the stripe pattern.

In some embodiments, if the number of target connected domain is too small or the length of the longest target connected domain is too short, the stripe set may be a failing stripe set. In order to improve the accuracy of searching the stripe set, the following judgment may be performed to remove the failing stripe set thereafter. Specifically, judging whether the stripe set satisfies the following conditions simultaneously: the number of the target connected domains in the stripe sets is greater than a number threshold, and a length of the longest target connected domain of the stripe sets is greater than a length threshold; deleting the stripe set if the conditions are not satisfied simultaneously, retaining the stripe set if the conditions are satisfied simultaneously.

Figure 8:
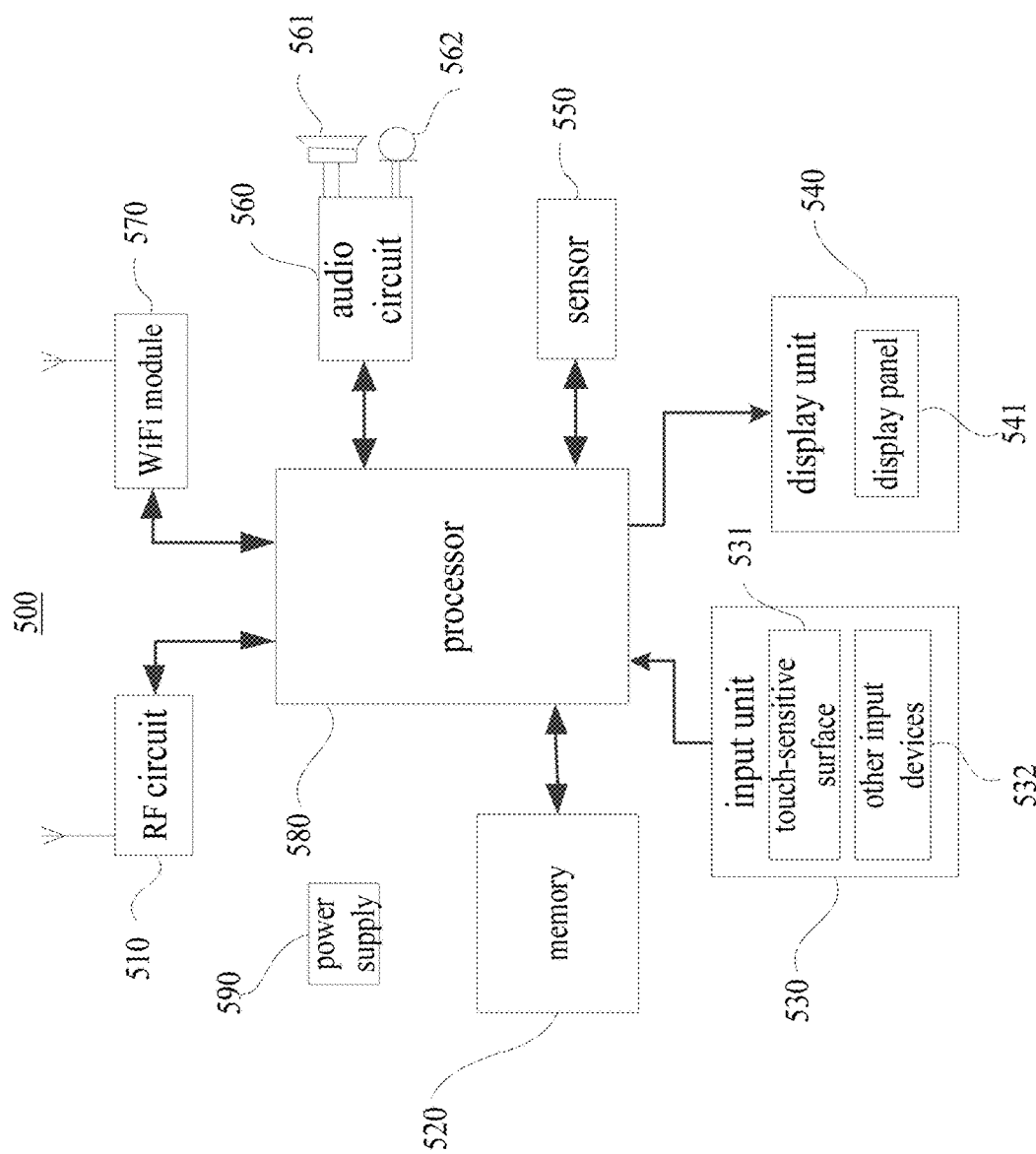
FIG. 8 illustrates a schematic structural view of an electronic device, according to some embodiments of the disclosure.

As illustrated in FIG. 8, the disclosure provides an electronic device 500. Specifically, the electronic device 500 may include a radio frequency (RF) circuit 510, a memory 520 having one or more computer readable medium, an input unit 530, a display unit 540, a sensor 550, an audio circuit 560, a wireless fidelity (WiFi) module 570, a processor 580 having one or more processing cores, and a power supply 590, and the like. It will be understood by those skilled in the art that the electronic device 500 structure shown in FIG. 8 does not constitute a limitation on the electronic device 500 and may include more or fewer components than illustrated, or to combine certain components, or different component arrangements. Wherein, The RF circuit 510 may be used to receive and transmit information, or to receive and transmit signals during a call. The downlink information of the base station is received and processed by one or more processors 580, and the uplink data is transmitted to the base station.

Typically, the RF circuit 510 may include, but is not limited to, an antenna, at least one amplifier, a tuner, one or more oscillators, a subscriber identity module (SIM) card, a transceiver, a coupler, an LNA (Low Noise Amplifier), a duplexer, etc. In addition, the RF circuit 510 may also communicate with the network and other devices by wireless communication. The wireless communication may use any communication standard or protocol including, but not limited to, GSM (Global System of Mobile communication), GPRS (General Packet Radio Service), CDMA (Code Division Multiple Access), WCDMA (Wideband Code Division Multiple Access) LTE (Long Term Evolution), e-mail, SMS (Short Messaging Service), and the like.

The memory 520 may be used to store software programs and modules. The processor 580 executes various functional applications and data processing by running software programs and modules stored in the memory 520. The memory 520 may mainly include a storage program area and a storage data area. Wherein the storage program area may store an operating system, at least one application program required for the function (such as voice playback, image playback and so on), and the like; the storage data area may store data (such as audio data, telephone book, etc.) created according to the use of the electronic device 500, and the like. In addition, the memory 520 may include high-speed random access memory, and also may include non-volatile memory, such as at least one disk storage device, flash memory device, or other volatile solid state memory device. Accordingly, the memory 520 may also include a memory controller to provide access to the memory 520 by the processor 580 and the input unit 530.

The input unit 530 may be used to receive input digital or character information and to generate a signal input of keyboard, mouse, joystick, optical or trackball related to user settings and function control. The input unit 530 may include a touch-sensitive surface 531 and other input devices 532. The touch-sensitive surface 531, also referred to as a touch screen or a touchpad, can collect a touch operation on or near the user (such as a user operation on the touch-sensitive surface 531 or near the touch-sensitive surface 531 using a finger or stylus or any suitable object or attachment) and drives the corresponding connection device according to a preset program. Alternatively, the touch-sensitive surface 531 may include both a touch detection device and a touch controller. Wherein the touch detection device detects a touching position of the user and detects a signal from the touch operation to transmit a signal to the touch controller. The touch controller receives the touch information from the touch detection device and converts it into contact coordinates and sends it to the processor 580 and can receive the command sent by the processor 580 and execute it. In addition, the touch-sensitive surface 531 can be realized by various types such as resistive, capacitive, infrared, and surface acoustic waves. In addition to the touch-sensitive surface 531, the input unit 530 may also include other input devices 532. Other input devices 532 may include, but are not limited to, one or more of physical keyboards, function keys (such as volume control keys, switch keys, etc.), trackballs, mice, joysticks, and the like.

The display unit 540 may be used to display information entered by the user or information provided to the user and various graphical user interfaces of the electronic device 500, which may be constructed from graphics, text, icons, video, and any combination thereof. The display unit 540 may include a display panel 541, and the display panel 541 may be configured in the form of Liquid Crystal Display (LCD), Organic Light-Emitting Diode (OLED), or the like. Further, the touch-sensitive surface 531 may cover the display panel 541. If the touch-sensitive surface 531 detects a touch operation on or near it, the touch-sensitive surface 531 sent the result to the processor 580 to determine the type of touch event. The processor 580 then provides a corresponding visual output on the display panel 541 according to the type of touch event. Although the touch-sensitive surface 531 and the display panel 541 are as two separate components in FIG. 8 to realize the input and input functions, but in some embodiments the touch-sensitive surface 531 may be integrated with the display panel 541 to achieve input and output function.

The electronic device 500 may also include at least one sensor 550, such as a light sensor, a motion sensor, and other sensors. In particular, the light sensor may include an ambient light sensor and a proximity sensor, wherein the ambient light sensor may adjust the brightness of the display panel 541 in accordance with the shading of the ambient light, and the proximity sensor may turn off the display panel 541 and/or make the display panel 541 backlight when the electronic device 500 is moved to the ear. As a kind of motion sensor, the gravitational acceleration sensor can detect the magnitude of the acceleration in all directions (usually three axes). When the gravity acceleration sensor is stationary, it can detect the size and direction of gravity, can be used to the application to identify the gesture of mobile phone gesture (such as vertical and horizontal screen switching, related games, magnetometer gesture calibration), vibration recognition related functions (such as pedometer, percussion) and so on. As for the electronic device 500 can also be configured gyroscopes, barometers, hygrometers, thermometers, infrared sensors and other sensors, will not repeat them here.

An audio circuit 560, a speaker 561, and a microphone 562 may provide an audio interface between the user and the electronic device 500. The audio circuit 560 may transmit the received electrical data converted by the received audio data to the speaker 561, and the speaker 561 converts the electrical signal into an audio signal output. On the other hand, the microphone 562 converts the captured sound signal into an electrical signal, the audio circuit 560 receives the electrical signal and converts it into audio data, outputs the audio data to the processor 580, the processor processes the audio data, the RF circuit 510 sends the processed audio data to, for example, another electronic device, or outputs the audio data to the memory 520 for further processing. The audio circuit 560 may also include an ear plug jack to provide communication between the peripheral headset and the electronic device 500.

WiFi is a short distance wireless transmission technology. Electronic device 500 through the WiFi module 570 can help users send and receive e-mail, browse the web and access streaming media. WiFi provides users with wireless broadband Internet access. Although FIG. 8 shows the WiFi module 570, the WiFi module 570 does not belong to the necessary configuration of the electronic device 500 and can be omitted as needed without departing from the spirit of the present disclosure.

The processor 580 is a control center of the electronic device 500, and various parts of the entire phone are connected by various interfaces and lines. The processor 580 performs various functions and processing data of the electronic device 500 by running or executing software programs and/or modules stored in the memory 520, and invoking the data stored in the memory 520, to monitor the phone overall. Optionally, the processor 580 may include one or more processing cores. Preferably, the processor 580 may integrate an application processor and a modem processor. Among them, the application processor mainly handles the operating system, the user interface and the application program and so on. The modem processor mainly handles wireless communications. It will be appreciated that the above-described modem processor may not be integrated into the processor 580.

The electronic device 500 also includes a power supply 590 (e.g., a battery) that supplies power to the various components. Preferably, the power supply may be logically connected to the processor 580 through a power management system to enable functions such as managing charging, discharging, and power management through the power management system. The power supply 590 may also include any one or more components such as DC or AC power, a recharging system, a power failure detection circuit, a power converter or an inverter, a power status indicator, and the like.

Although not shown, the electronic device 500 may include a camera, a Bluetooth module and so on, and will not be described again. Specifically, the display unit of the electronic device 500 is a touch screen display. The electronic device 500 also includes a memory, and one or more programs. Wherein the one or more programs are stored in memory and configured to be executed by one or more processors. The one or more programs contain instructions for performing the following operations.

Receiving a raw image captured by the rolling shutter image sensor, wherein the raw image includes stripe pattern formed by flashing light source; binarizing the raw image to obtain a binary image, according to a binary threshold, wherein the binary image has two pixel values, one of two pixel values is set as a preset first value; searching a connected domain having pixels with a first value to obtain a plurality of first connected domains, according to the pixel value in the binary image; selecting a target connected domain corresponding to the stripe pattern from the plurality of first connected domains; determining stripe set according to the target connected domain, wherein the stripe set is the set of the target connected domain corresponds to the stripe pattern.

Optionally, selecting a target connected domain corresponding to the stripe pattern from the plurality of first connected domains, comprises: determining a width of each of the first connected domains, comparing the width of each first connected domain with a preset width, determining the eligible first connected domain as the target connected domain according to the result of comparison.

Optionally, comparing the width of each first connected domain with a preset width, determining the eligible first connected domain as the target connected domain according to the result of comparison, comprises: setting an x-axis having the extension direction of stripe of the preset stripe pattern, and taking a y-axis perpendicular to the x-axis, according to imaging plane of the rolling shutter image sensor; traversing all of the pixels of the plurality of first connected domains to obtain a maximum column coordinates y1 and a minimum column coordinates y2 of the pixels in each first connected domain; taking the maximum column coordinate y1 minus the minimum column coordinate y2 to determine the width of each first connected domain; judging whether the width of each first connected domain is met: w≥kh1, and w≤kh2, wherein kh1 is a preset first boundary condition parameter, kh2 is a preset second boundary condition parameter, w is the width of the first connected domain; selecting the first connected domain as the target connected domain when the width of the first connected domain is met: w≥kh1, and w≤kh2.

Optionally, further comprising: deleting first connected domain, when the width of the first connected domain is met: w<kh1 or w>kh2, from the plurality of first connected domains.

Optionally, further comprising: prior to selecting the target connected domain, processing the raw image to obtain a template of stripe pattern; identifying the target connected domain according to the template of stripe pattern, wherein the shape of the template of stripe pattern is a light spot formed by the stripe pattern in the raw image.

Optionally, processing the raw image comprises: filtering the raw image according to a filtering parameter to obtain a blurred image, wherein the filtering parameter is configured to merge the stripe pattern in the raw image into a light spot; binarizing the blurred image to obtain a binary blurred image; searching the connected domain in the binary blurred image to obtain a plurality of second connected domains; identifying the shape of the plurality of second connected domains, and selecting a second connected domain closest to the stripe pattern formed by the predetermined flashing light source as the template of stripe pattern.

Optionally, identifying the target connected domain comprises: judging whether the coordinates of all pixels of the first connected domain fall within the set of the coordinates of the pixels in the template of stripe pattern. If yes, determining the first connected domain as the target connected domain.

Optionally, the raw image includes a plurality of stripe patterns formed by a plurality of flashing light sources, determining stripe set according to the target connected domain comprises: classifying the target connected domains to obtain a plurality of stripe sets.

Optionally, classifying the target connected domains to obtain a plurality of stripe sets comprises: determining an initial stripe set according to the condition of the target connected domain constitutes a stripe set, and selecting the target connected domain which is not classified as any initial stripe pattern; selecting the jth target connected domain from the target connected domains which are not classified into any initial stripe set, wherein j is a positive integer; making a circle having a center corresponds to the center of mass of the jth target connected domain, and a diameter corresponds to the length of the jth target connected domain; judging whether any of the target connected domains in the initial stripe set intersects the circle; if intersects, classifying the jth target connected domain into the initial stripe set correspondingly.

Optionally, further comprising: after classifying the target connected domains to obtain a plurality of stripe sets, judging whether the stripe set satisfies the following conditions simultaneously: the number of the target connected domains in the stripe sets is greater than a number threshold, and a length of the longest target connected domain of the stripe sets is greater than a length threshold; deleting the stripe set, if the conditions are not satisfied simultaneously.

To further optimize the motion tracking system, the present disclosure also provides another motion tracking system. The difference from the motion tracking system shown in FIG. 1 is that both the rolling shutter image sensor and the image processing device are integrated in the electronic device 500. Wherein, the electronic device 500 can be smart phones, laptops, tablet computers, driving recorder, video recorders, projectors, and so on.

The embodiment of the present disclosure also provides an image processing system. The difference from the motion tracking system shown in FIG. 1 is that the image processing system includes only a rolling shutter image sensor and an image processing device, and does not include a controller.

The embodiments of the present disclosure also provide a stripe set searching device including a unit capable of implementing the method shown in FIG. 4, specifically referring to FIG. 4 and the related description, which will not be described here.

The nature of the technical solution of the present application, the part contributing to the prior art, or all or part of the technical solution may be embodied in the form of a software product. The computer software product is stored in a storage medium and includes instructions for causing a computer device (which may be a personal computer, a server, or a network device, etc.) or a processor to perform all or part steps of the method described in each of the embodiments of the present application. The aforementioned storage medium includes a variety of media such as a USB disk, a mobile hard disk, a read-only memory (ROM), a random access memory (RAM), a magnetic disk, or an optical disk, which can store program code.

What is claimed is:

1. A method for searching a stripe set, comprising:
    receiving a raw image captured by a rolling shutter image sensor, wherein the raw image includes a stripe pattern formed by a flashing light source;
    binarizing the raw image to obtain a binary image, according to a binary threshold, wherein the binary image has two pixel values, one of the two pixel values is set as a preset first value;
    searching the binary image to obtain a plurality of first connected domains each having pixels with the first value;
    selecting a plurality of target connected domains corresponding to the stripe pattern from the plurality of first connected domains, comprising:
        determining a width of each first connected domain;
        comparing the width of each first connected domain with a preset width; and
        determining eligible first connected domains as the plurality of target connected domains according to the result of comparison; and
    determining a stripe set according to the plurality of target connected domains, wherein the stripe set is a set of the target connected domains corresponding to the stripe pattern.

2. The method of claim 1, wherein comparing the width of each first connected domain with a preset width, and determining eligible first connected domains as the plurality of target connected domains comprises:
    setting an x-axis having an extension direction of a stripe of a preset stripe pattern, and taking a y-axis perpendicular to the x-axis, according to an imaging plane of the rolling shutter image sensor;
    traversing all pixels in each first connected domain to obtain a maximum column coordinate y1 and a minimum column coordinate y2 of the pixels in each first connected domain;
    taking the maximum column coordinate y1 minus the minimum column coordinate y2 to determine the width of each first connected domain;
    judging whether the width of each first connected domain is met: w≥kh1 and w≤kh2, wherein kh1 is a preset first boundary condition parameter, kh2 is a preset second boundary condition parameter, w is the width of the first connected domain; and
    selecting the first connected domain as the target connected domain when the width of the first connected domain is met: w≥kh1 and w≤kh2.

3. The method of claim 2, further comprising:
    deleting the first connected domain, whose width meets w<kh1 or w>kh2, from the plurality of first connected domains.

4. The method of claim 1, wherein the raw image includes a plurality of stripe patterns formed by a plurality of flashing light sources, determining a stripe set according to the plurality of target connected domains comprises:
    classifying the plurality of target connected domains to obtain a plurality of stripe sets.

5. The method of claim 4, wherein classifying the target connected domains to obtain a plurality of stripe sets comprises:
    determining a plurality of initial stripe sets according to the condition of target connected domains constitute stripe sets, and selecting the target connected domains which are not classified into any initial stripe set;
    selecting a jth target connected domain from the target connected domains which are not classified into any initial stripe set, wherein j is a positive integer;
    making a circle having a center corresponds to the center of mass of the jth target connected domain and a diameter corresponds to the length of the jth target connected domain;
    judging whether any of the target connected domains in the initial stripe sets intersects the circle; and
    if intersects, classifying the jth target connected domain into the corresponding initial stripe set.

6. The method as claimed in claim 4,
after classifying the plurality of target connected domains to obtain a plurality of stripe sets, the method further comprising:
judging whether each stripe set satisfies the following conditions:
the number of the target connected domains in the stripe set is greater than a number threshold, and a length of the longest target connected domain of the stripe set is greater than a length threshold;
deleting the stripe set if the conditions are not satisfied, and retaining the stripe set if the conditions are satisfied.

7. An electronic device comprising:
a rolling shutter image sensor;
one or more processors; and
a memory storing one or more programs configured to be executed by the one or more processors, the one or more programs including instructions for:
receiving a raw image captured by the rolling shutter image sensor, wherein the raw image includes a stripe pattern formed by a flashing light source;
binarizing the raw image to obtain a binary image, according to a binary threshold, wherein the binary image has two pixel values, one of the two pixel values is set as a preset first value;
searching the binary image to obtain a plurality of first connected domains each having pixels with the first value;
selecting a plurality of target connected domains corresponding to the stripe pattern from the plurality of first connected domains, comprising:
determining a width of each first connected domain;
comparing the width of each first connected domain with a preset width; and
determining eligible first connected domains as the plurality of target connected domains according to the result of comparison; and
determining a stripe set according to the plurality of target connected domains, wherein the stripe set is a set of the target connected domains corresponding to the stripe pattern.

8. The electronic device of claim 7, wherein the raw image includes a plurality of stripe patterns formed by a plurality of flashing light sources, determining a stripe set according to the plurality of target connected domains comprises:
classifying the plurality of target connected domains to obtain a plurality of stripe sets.

9. The electronic device of claim 7, wherein
after classifying the target connected domains to obtain a plurality of stripe sets, the one or more programs further include instructions for:
judging whether each stripe set satisfies the following conditions simultaneously:
the number of the target connected domains in the stripe set is greater than a number threshold, and a length of the longest target connected domain of the stripe set is greater than a length threshold;
deleting the stripe set if the conditions are not satisfied simultaneously.

10. The electronic device of claim 9, wherein the one or more programs further include instructions for:
retaining the stripe set that satisfies the conditions.

11. The electronic device of claim 7, wherein comparing the width of each first connected domain with a preset width, and determining eligible first connected domains as the plurality of target connected domains comprises:
setting an x-axis having an extension direction of a stripe of a preset stripe pattern, and taking a y-axis perpendicular to the x-axis, according to an imaging plane of the rolling shutter image sensor;
traversing all pixels in each first connected domain to obtain a maximum column coordinate y1 and a minimum column coordinate y2 of the pixels in each first connected domain;
taking the maximum column coordinate y1 minus the minimum column coordinate y2 to determine the width of each first connected domain;
judging whether the width of each first connected domain meets w≥kh1 and w≤kh2, wherein kh1 is a preset first boundary condition parameter, kh2 is a preset second boundary condition parameter, w is the width of the first connected domain; and
selecting the first connected domain whose width meets w≥kh1 and w≤kh2, as the target connected domain.

12. The electronic device of claim 11, further comprising:
deleting the first connected domain whose width meets w<kh1 or w>kh2, from the plurality of first connected domains.

13. A non-transitory computer readable storage medium storing one or more programs configured to be executed by one or more processors of an electronic device, the one or more programs comprising instructions for:
receiving a raw image captured by a rolling shutter image sensor, wherein the raw image includes a plurality of stripe patterns formed by a plurality of flashing light sources;
binarizing the raw image to obtain a binary image, according to a binary threshold, wherein the binary image has two pixel values, one of the two pixel values is set as a preset first value;
searching the binary image to obtain a plurality of first connected domains each having pixels with the first value;
selecting a plurality of target connected domains corresponding to the stripe patterns from the plurality of first connected domains;
classifying the plurality of target connected domains to obtain a plurality of stripe sets, wherein each stripe set is a set of the target connected domains corresponding to one of the stripe patterns;
judging whether each stripe set satisfies two conditions: the number of the target connected domains in the stripe set is greater than a number threshold, and a length of the longest target connected domain in the stripe set is greater than a length threshold; and
deleting the stripe set failed to satisfy the two conditions.

14. The non-transitory computer readable storage medium of claim 13, wherein selecting a plurality of target connected domains comprises:
determining a width of each first connected domain;
comparing the width of each first connected domain with a preset width; and
determining eligible first connected domains as the target connected domains according to the result of comparison.

15. The non-transitory computer readable storage medium of claim 14, wherein comparing the width of each first connected domain with a preset width, and determining eligible first connected domains as the plurality of target connected domains comprises:

setting an x-axis having an extension direction of a stripe of a preset stripe pattern, and taking a y-axis perpendicular to the x-axis, according to an imaging plane of the rolling shutter image sensor;

traversing all pixels in each first connected domain to obtain a maximum column coordinate y1 and a minimum column coordinate y2 of the pixels in each first connected domain;

taking the maximum column coordinate y1 minus the minimum column coordinate y2 to determine the width of each first connected domain;

judging whether the width of each first connected domain meets w≥kh1 and w≤kh2, wherein kh1 is a preset first boundary condition parameter, kh2 is a preset second boundary condition parameter, w is the width of the first connected domain; and selecting the first connected domain whose width meets w≥kh1 and w≤kh2, as the target connected domain.

16. The non-transitory computer readable storage medium of claim 15, further comprising:

deleting the first connected domain whose width meets w<kh1 or w>kh2, from the plurality of first connected domains.

17. The non-transitory computer readable storage medium of claim 13, wherein the one or more programs further comprising instructions for:

retaining the stripe set that satisfies the two conditions.

18. The non-transitory computer readable storage medium of claim 13, prior to selecting a plurality of target connected domains corresponding to the stripe patterns from the plurality of first connected domains, the one or more programs further comprising instructions for:

processing the raw image to obtain a template of stripe pattern;

wherein selecting a plurality of target connected domains corresponding to the stripe patterns from the plurality of first connected domains comprises:

identifying the plurality of target connected domains according to the template of stripe pattern.

19. The non-transitory computer readable storage medium of claim 18, wherein identifying the plurality of target connected domains comprises:

judging whether the coordinates of all pixels of each first connected domain fall within the set of the coordinates of the pixels in the template of stripe pattern;

if yes, determining the first connected domain as the target connected domain.

20. The non-transitory computer readable storage medium of claim 18, wherein processing the raw image comprises:

filtering the raw image according to a filtering parameter to obtain a blurred image, wherein the filtering parameter is configured to merge the stripe pattern in the raw image into a light spot;

binarizing the blurred image to obtain a binary blurred image;

searching the binary blurred image to obtain a plurality of second connected domains;

identifying shapes of the plurality of second connected domains; and selecting the second connected domain closest to the stripe pattern formed by a predetermined flashing light source as the template of stripe pattern.

* * * * *